United States Patent [19]

Moran et al.

[11] Patent Number: 4,820,530
[45] Date of Patent: Apr. 11, 1989

[54] MANUFACTURE OF CURD AND CHEESE FROM A MILK RETENTATE

[75] Inventors: James W. Moran, Lindenhurst; James R. Posdal, Glenview; Gary W. Trecker, Wheeling, all of Ill.

[73] Assignee: Kraft, Incorporated, Glenview, Ill.

[21] Appl. No.: 649,838

[22] Filed: Sep. 11, 1984

[51] Int. Cl.$^4$ .................. A23C 19/05; A23C 19/00; A23C 19/024; A23C 19/028

[52] U.S. Cl. ........................... 426/40; 426/36; 426/491; 426/492

[58] Field of Search .............. 426/36, 40, 42, 491, 426/492

[56] References Cited

U.S. PATENT DOCUMENTS

| | | | |
|---|---|---|---|
| 3,120,443 | 2/1984 | Berridge | 426/36 |
| 3,899,596 | 8/1975 | Stenne | 426/40 |
| 3,914,435 | 10/1975 | Maubois et al. | 426/36 |
| 3,988,481 | 10/1976 | Coulter et al. | 426/40 |
| 4,244,971 | 1/1981 | Wargel et al. | 426/42 |
| 4,401,679 | 8/1983 | Rubin et al. | 426/36 |

FOREIGN PATENT DOCUMENTS 8201806  6/1982  PCT Int'l Appl. .................. 426/40

OTHER PUBLICATIONS

Ernstrom et al. (1980) Journal of Dairy Science, vol. 63, pp. 228–234.

Primary Examiner—David M. Naff
Attorney, Agent, or Firm—Fitch, Even, Tabin & Tabin

[57] ABSTRACT

High solids curd and cheese are produced by fermenting and evaporating a milk retentate. Preferably, moisture is evaporated under vacuum to 55 percent or more solids while the fermented retentate is spread on a drum surface. Curd is formed on the surface under quiescent conditions and is doctored off without substantial breakdown of curd structure. Salts such as sodium chloride may be added to the retentate to prevent coagulation during fermentation. A milk clotting enzyme may be added after fermentation and before evaporation in an amount insufficient to cause coagulation which is avoided prior to curd formation.

10 Claims, No Drawings

MANUFACTURE OF CURD AND CHEESE FROM A MILK RETENTATE

The present invention relates generally to the manufacture of curd and cheeses from milk and, more particularly, relates to a process for the manufacture of curd and cheeses from milk retentates which are evaporated.

BACKGROUND OF THE INVENTION

The manufacture of cheeses or cheese base materials from milk through preparation of a retentate by removal of salts, lactose and water has been taught in various patents and literature references. For example, a patent to Coulter, et al., entitled "Cheese Manufacture from Molecular Sieved Milk," issued Oct. 26, 1976, U.S. Pat. No. 3,988,481, teaches the preparation of cheese from milk which has been de-lactosed and de-watered by a process involving molecular sieving a standardized milk to substantially separate and remove lactose and water-soluble minerals from the milk to render the milk substantially sugar-free, and adding a curd-forming agent to produce curd. The resulting curd is subjected to conventional handling without substantial syneresis to produce a cheese, and molded to a desired form.

A patent to Stenne, entitled "Method for the Manufacture of Cheeses," issued Aug. 12, 1975, U.S. Pat. No. 3,899,596, discloses a process for the production of cheese which comprises treating milk by ultrafiltration to obtain a product having at least some of the protein constituents of the milk, renneting the liquid product after inoculation with suitable ferments, and introducing a batch of the renneted liquid into a vertical chamber in which it is left to coagulate. The coagulum is cut into slabs which provide the end product cheese.

A patent to Maubois, et al., entitled "Manufacture of Cheese from Ultrafiltered Milk," issued Oct. 21, 1975, U.S. Pat. No. 3,914,435, teaches cheese made from heat-treated milk and without conventional draining of whey by a process which involves ultrafiltering of the milk to produce a concentrate having essentially the composition of cheese produced by conventional whey draining processes. The process enables the milk, after ultrafiltration, to be heat-treated without making the milk more difficult to coagulate with rennet, which difficulty normally occurs when milk is heated to high temperatures.

A patent issued to Wargel, et al., entitled "Process and Products from the Manufacture of Cheese-flavored Products," issued June 13, 1981, U.S. Pat. No. 4,244,971, teaches the manufacture of cheeses and process cheese, from ultrafiltered milk.

A patent entitled "Process for Preparing Cheese base," issued Aug. 30, 1983, to Rubin, et al., U.S. Pat. No. 4,401,679, discloses a process for preparing cheese base by concentrating milk through ultrafiltration, combined with diafiltration and evaporation, wherein the retentate from the ultrafiltration is inoculated with an acid culture before evaporation, and after evaporation acidification proceeds to completion in packing.

Further, cheese base material has been taught by evaporating moisture from retentate under turbulent conditions to provide a lower moisture condition. Such a process is described in an article by Ernstrom, et al., entitled "Cheese base for Processing: A High-yield Product from Whole Milk by Ultrafiltration," published in the *Journal of Dairy Science*, volume 63, 228-234 (1980). The article teaches a process wherein whole milk of normal pH, or acidified to a pH of 5.7, is concentrated by ultrafiltration to about 40 percent of the original milk weight and diafiltered at constant volume until a desired ratio of lactose to buffer capacity is established. Then the retentate is further concentrated by ultrafiltration to 20 percent of the original milk weight. The retentate is then inoculated with cheese starter and incubated to completely ferment the residual lactose, pH control being achieved by controlling the level of lactose from the diafiltration step of the process. The product is further concentrated in a swept-surface vacuum-pan evaporator or a Luwa evaporator. It is pointed out that the use of a batch evaporator is necessitated when the retentate, upon fermentation, curdles or coagulates, since such a product cannot be readily processed in any continuous-flow evaporator.

It is known to add salt during fermentation to prevent coagulation and this was understood many years ago. See: *LeLait*/November–December, 1974/No. 539-540. Further, it has been disclosed that salt in the retentate may facilitate evaporation as disclosed in an Australian Application, which is the subject of a published application under the Patent Cooperation Treaty WO82/01806, published June 10, 1982.

However, the prior art teaches that addition of rennet or other coagulating enzymes to high-solids milk systems causes rapid coagulation, a condition to be avoided during evaporation, as indicated above, since the evaporation is highly inefficient after coagulation occurs. On the other hand, the presence of coagulating enzymes may be desired, particularly in higher-solids cheese, to provide the conventional presence of para kappa casein. The kinetics of enzymatic coagulation of milk is disclosed by Alfred Carlson, in a thesis published in 1982, at the University of Wisconsin, entitled "The Kinetics of Enzymatic Coagulation of Milk."

In the conventional making of cheese with rennet, the macro peptides formed by rennet action are lost in the whey with consequent reduction in yield and loss of nutritious milk protein material. Accordingly, it would be desirable to enjoy the benefit of rennet action while avoiding whey removal with consequent loss of macro peptides.

Further, prior art methods for making cheese base materials at higher-solids with evaporation, in which evaporation is effected with high turbulence or the cheese base material is recovered with substantial working after evaporation, has resulted in destabilization of the higher-solids cheese base material, and a body and texture unlike various cheeses. This destabilization is particularly noticeable at total solids in excess of about 60 to 62 percent, e.g., a cheese such as cheddar cheese, but is also present at solids as low as 55 percent. Accordingly, cheese base materials heretofor produced by evaporating retentates to a total solids in excess of 60 percent hve not provided the typical body and texture characteristics of high-solids cheeses.

In addition, the use of high turbulence throughout evaporation or working after evaporation does not provide a product having a likeness to curd. Prior art methods for making cheese from retentates with evaporation techniques do not disclose a method for making a curd-like product.

The prior art teaches many different steps in respect to the manufacture of cheeses and cheese base materials from milk retentates. Evaporation of milk retentates is a previously known technique, but the resultant product does not have curd character, nor does it convert to a product having the body and texture of cheese. Also, much of the prior art is directed toward the manufacture of higher moisture or soft cheeses, and it has not been directed toward the production of high-solids cheeses from retentates by means of evaporation of retentates. The difficulty which occurs with turbulence at higher-solids, i.e., above 55 percent total solids, is that the product destabilizes and exudes fat, and high-solids product, i.e., above 60 percent total solids, does not have the characteristic cheese body and texture. If the moistures are high enough, fat exudation can be avoided and the body and texture of soft cheeses can be provided.

While, as before indicated, the addition of milk clotting or coagulating enzymes to retentates has been known, such addition has generally been made with concurrent formation of a coagulum which cannot be readily subjected to evaporation, and which is destroyed by turbulence and/or working. The addition of milk clotting enzymes, without coagulation, prior to an evaporation step has not been disclosed. Again, there is not provision in the prior art of a stable high-solids cheese base material or cheese made from an evaporated retentate and having the body and texture of conventionally made cheese.

Accordingly, despite the many teachings of the prior art relating to the manufacture of cheese base material and cheese from retentates derived from milk, there has been a serious lack of a process for producing curd from an evaporation step and high-solids cheese which is stable and which can have the body and texture of American-type cheese.

For purposes of this application, the term "higher-solids cheese" refers to cheeses which have a total solids in excess of 55 percent, whereas the term "high-solids cheeses" is used to refer to those cheeses which have a solids content in excess of 60 percent, and such cheeses are commonly referred to in the trade as hard cheeses. The cheeses having between 55 percent and 60 percent total solids are referred to herein as "semi-soft cheeses." Also for purposes of this application, the term "milk" is meant to include raw whole milk, skim milk, and milk which has been standardized and which may have been pasteurized, clarified, and/or subjected to other appropriate treatment processes.

It is a principal object of this invention to provide a curd and cheese from a retentate by means of evaporation techniques, the curd having knitting characteristics and the cheese having a typical cheese body and texture characteristics.

A further object of this invention is to provide a higher-solids cheese which is stable and does not oil-off, and is manufactured by processing a milk retentate with evaporation techniques.

Another object of this invention is to provide a curd and cheese in which there is formed a substantial percentage of para kappa casein in a process using continuous evaporation methods and equipment.

Still another object of the invention is to provide a process for the manufacture of curd and cheese in which the milk proteins have been subjected to the action of a milk clotting enzyme but which process avoids loss of macro peptides.

A still further object of this invention is the provision of a curd and cheese, made with evaporation of a retentate, which can be pressed and cured like cheese in conventional processes.

Still further objects and advantages of the invention will become apparent by reference to the following description.

GENERAL DESCRIPTION OF INVENTION

In accordance with this invention, milk is treated by known processes to provide a retentate having between about 83 percent and about 50 percent moisture; between about 0.7 percent and about 2.5 percent salts, based upon the salts in the milk; and less than 1.8 percent lactose. The retentates from whole milk will have a moisture between about 70 percent and about 50 percent, a salts level between about 1.0 percent and 2.5 percent, and a lactose level below about 1.8 percent. On the other hand, retentates from skim milk will have a moisture between about 83 percent and about 78 percent, a salts level between about 0.7 percent and about 1.9 percent, and lactose below about 0.6 percent. The fat content of the retentate can be adjusted by standardization of the milk or by addition of cream.

Various techniques are known in the art for achieving the indicated retentates, for example ultrafiltration, with or without diafiltration. Commercial apparatus is marketed and available for the preparation of such retentates, and the apparatus is in present use in the cheese industry. The operation of such apparatus is believed to be within the skill of the art. Preferably, in the practice of the invention, the milk is treated by ultrafiltration and diafiltration to provide the desired level of constituents in the retentate.

The total solids of the retentate should not be so high as to result in gelation of the retentate during processing and it has been found that the total solids content of the retentate made from whole milk should be less than about 38, percent and for best operation in the manufacture of American-type cheese should be greater than 30 percent. When the retentate is prepared from skim milk, for best operation, the total solids content of the retentate should be less than about 22 percent and should be greater than 17 percent. When the retentate is prepared from skim milk, it will be adjusted with cream being added to achieve a solids level in the mixture of between about 27 percent and about 33 percent for best operations.

The retentate, or adjusted retentate, is then fermented by mixing with conventional cheese cultures or starters, and particularly those commercially available and normally used in the manufacture of American-type cheeses, such as *Streptococcus lactis*, *Streptococcus cremoris*, and other well known organisms. The term American-type cheese is meant to include cheddar cheese. The retentate may have enzymes added to enhance flavor in the end product, such as certain lipases and proteases which hydrolyze fat and protein in the retentate. The enzymes also serve to reduce viscosity in the system which serves to avoid gelation in the process. These enzymes are also known to the cheese industry and their addition has been previously disclosed in the manufacture of cheese.

The fermentation is continued until the acid in the retentate has lowered the pH to the range of between about 4.9 and about 5.6. The pH can be controlled by controlling the lactose level in the retentate. Stated another way, the cheese cultures serve to convert the lactose to lactic acid, thereby increasing the acid and lowering the pH. Again, it is important that the fermentation be controlled in such a manner as to prevent coagulation. This may be achieved in different ways as by having lower total solids in the retentate or, as has been known for many years, by the inclusion of salts, such as sodium chloride, at the fermentation step.

The fermented retentate may then be mixed with a milk clotting enzyme commonly used in cheese manufacture and widely available commercially. Perhaps the best known coagulating enzyme in cheese making is veal rennet. However, a number of other milk clotting enzymes are known in the cheese industry, as for example, microbial rennets, such as *Mucor meheii*. These enzymes are known to cause conversion of kappa casein to para kappa casein in cheese by their action upon kappa casein in the milk. Equivalents to these well known milk clotting enzymes can be utilized if they effect the conversion of kappa casein like the milk clotting enzymes. In conventional cheese making, the coagulating enzymes cause clotting of milk with substantially all of the para kappa casein being formed in the vat coincident with the setting of the milk. Also, the milk clotting enzymes form macro peptides which, in conventional cheese manufacture, are substantially removed with the whey. When the milk solids are increased, the prior art teaches more rapid coagulation and formation of para kappa casein.

In the process of this invention, coagulation is to be avoided prior to provision of the curd, and it has been found that formation of para kappa casein is not necessary to provide a curd which will form cheese, with a typical cheese body and texture. However, it has been discovered that the coagulating enzyme can be added in such low amounts that coagulation is avoided and yet para kappa casein develops in the end product to sufficient levels to provide a curd which will form cheese. The milk clotting enzyme, if added, should be less than a coagulating amount, but should be in an amount which will cause conversion of at least about 65 percent of the kappa casein to para kappa casein. The percent of kappa casein conversion is determined by first measuring the amounts of para kappa casein and kappa casein in accord with the procedure reported in *Journal of Dairy Science*, Vol. 64, Supplement 1 (1981) at page 63; and then calculating the percentage by the following formula:

Percent of kappa casein conversion =

$$\frac{1.5 \times (\text{Amount of p. kappa casein})}{(\text{Amt. of kappa casein}) + 1.5 \times (\text{Amt. of p. kappa casein})} \times 100$$

The particular amount of milk clotting enzyme added will vary, depending upon the specific enzyme used and its activity under the conditions of the process. We have found that, for desired commercial operations, the amount, if used, should cause at least about 65 percent of the kappa casein to be converted to para kappa casein in about three but less than fourteen days after evaporation.

The milk clotting enzyme when used is desirably introduced after fermentation by before evaporation. Preferably, the milk clotting enzyme is introduced just before evaporation.

During evaporation, it is desirable that the temperature of the product not exceed 75° F. for a number of reasons. Excessive temperatures reduce bacterial activity, as well as enzyme activity. Further, high temperatures can affect the casein and salts in the system. It has been found that the curd should exit from the evaporator at a temperature below about 85° F. and preferably below about 75° F. and can be collected and hooped. The curd should be pressed and quickly cooled, and this can be achieved by placing it in a 45° F. storage room. This product is cheese. The curd, when observed under a scanning electron microscope, regardless of addition of milk clotting enzyme, has a typical curd-like appearance.

In order to achieve the curd, this invention contemplates evaporation with substantially quiescent conditions occurring as the curd approaches the end solids content, and not substantial working of the curd at the end of evaporation. Quiescent conditions are particularly important at the end of evaporation and when the product nears and exceeds 55 percent moisture. High turbulence will normally occur through evaporation and discharge from a swept-surface evaporator, such as a Turba-Film evaporator or a Luwa evaporator. These turbulent conditions tend to destabilize higher-solids product and the product out of the evaporator at 75° F., if pressed or squeezed, exudes fat and does not provide, at this point, a product having typical cheese body and texture. On the other hand, this invention involves holding the product quiescent as the last desired moisture is removed and curd is formed, and collecting the curd, without significant working, as a curd which can be pressed in a conventional manner. The product will knit and achieve the body and texture of conventionally made cheese. The curd may be cut after formation and such cutting is not considered working, as it does not break down the curd structure as would occur in an auger conveyor.

While the evaporation under quiescent conditions, near 55 percent total solids and higher solids, can be achieved in various apparatus, a vacuum drum drier is a particularly effective evaporator for achieving the result. The drum drier can be a single drum or a double-drum drier with the fermented retentate being sprayed on the drum(s) or being spread along a nip between two drums. Of course, significant turbulence can occur during spraying or in the nip, and upon initial evaporation on the drums. However, such initial tubulence is not detrimental to the provision of the curd. The criticality of quiescence occurs near 55 percent total solids and higher. Working at the time of removal from the drums, and thereafter, should be minimized. Thus, the doctoring off or otherwise removing the curd from the drums should be carefully carried out so as to avoid destabilizing the curd or disrupting of the structure. Usually, the curd will be doctored off in sheets.

Salt is sometimes a necessary ingredient in the cheese, and the term "salt," as used herein, includes salt substitutes. The salt can function in a number of ways in the process, but can also interfere with various operations. As pointed out, salt may be added during fermentation to limit coagulation, but excessive salt can affect bacterial growth during fermentation. Salt can be added prior to evaporation and improve evaporation efficiency by lowering viscosity, but is not necessary to efficient evaporation. Further, salt can be added during evaporation or after evaporation as in conventional cheese manufacture. Thus, salt may be added at several points in the process. In any event, salt is added in an amount(s) which provides an end salt content typical of the cheese being made.

The cheese need not be texturized to provide cheese body and texture. The cheese can be used in process cheese manufacture or cured out to provide a cutting cheese.

The practice of the invention will be more clearly understood by reference to the following examples.

EXAMPLE I

Raw whole milk is stored at 40° F. and is standardized to a desired protein-to-fat ratio in the range of about 0.78. Standardization is achieved by the addition of cream or the removal of cream. Cream which is heat-treated at 175° F. for sixteen seconds is used when addition is necessary. The standardized milk is then pasteurized at 162° F. for sixteen seconds, cooled, and held at 40° F.

The standardized milk is subjected to ultrafiltration to achieve a concentration of 4.75-fold, and then is diafiltered. The diafiltration is run at about 1.5 to 1 (water-to-concentrate). After diafiltration, ultrafiltration is continued until a 5.28-fold concentration, based upon the original milk volume, is achieved. The ultrafiltration-diafiltration process is conducted to achieve a lactose level of about 0.9 percent, so that the pH reduction during fermantation will be limited to about 5.2, and to provide milk salts or ash at a level of about 1.3 percent. The retentate has about 35 percent total solids.

The concentrated retentate is pasteurized at 165° F. for sixteen seconds and cooled to 60° F. and held in an agitated tank at about 60° F. until needed for fermentation. The maximum storage time at this temperature is less than sixteen hours. A temperature of 60° F. is employed because lower temperatures increase viscosity to unacceptable levels for the purpose. The retentate is found to be microbiologically stable under these storage conditions.

The concentrated retentate is then warmed to 70° F. for fermentation. A salt (sodium chloride) solution is added at a level of 0.4 percent (by weight of salt-to-retentate) to limit coagulation during fermentation. A conventional lactic starter culture is used, specifically, Hansen's Direct Vat Set 970, for effecting the fermentation. The culture is used at a level of about 0.24 milliliters per pound of retentate at 35 percent total solids. Pregastric esterases (lipase) are added. These enzymes are obtained from Dairyland Food Laboratories, Inc. The pregastric esterases are added at a level of about 0.043 grams per pound of retentate at 35 percent total solids. The addition level is adjusted to achieve the desired end flavor.

The fermentation is carried out at 70° F. for ten-twelve hours and until the fermented retentate reaches a pH of 5.2. After fermentation, 0.515 percent salt (sodium chloride) based on the weight of retentate, is added, so as to bring the final salt in the cheese, at 65 percent solids, to about 1.7 percent. After the desired pH level is achieved, the temperature of the fermented retentate is lowered to 60° F.

The fermented retentate is introduced into a Blaw-Knox vacuum double-drum drier. The drums have chrome plated surfaces and are disposed in a chamber. Each drum has a diameter of 32 inches and a length of 72 inches. An absolute pressure of 24 millimeters of mercury absolute (77° F.) is maintained in the chamber during evaporation. The drums are spaced to provide a nip gap of 0.035 inches and rotate at 2.25 RPM. Saturated steam is introduced into the drums at 185° F. and the temperature of the condensate leaving the drums is 178° F.

The fermented retentate at a temperature of about 72° F., is fed to maintain a nip level between the drums and at a total solids content of 34.3 percent, at a rate of 965 pounds per hour. Each drum rotates counter to the other and the fermented retentate remains on each drum about 180 degrees of rotation whereupon it is doctored off the drums by means of a knife blade. At removal, the curd has a moisture content of about 65 percent and is produced at the rate of 509 pounds per hour.

The fermented retentate boils in the nip and bubbles initially on the surface of the drums but achieves quiescence upon the drums at about 52 percent solids and remains in this state until doctored off the drums. The doctor blades cause curd to leave the drums as a sheet which is collected in a trough without significant loss of structure. The collected curd is hooped and pressed overnight in a conventional cheese press, whereupon it is cooled in a 45° F. cooler. After ten days, the curd is knitted and has the body and texture of cheese.

EXAMPLE II

The fermented retentate of Example I is prepared and the same vacuum double-drum drier is used, and the drums are spaced apart 0.035 inches, but no liquid level is maintained in the nip. The fermented retentate is spread upon each drum to establish a blanket having a thickness of about 0.0175 inches. The conditions of operation of the vacuum double-drum drier are maintained as in Example I and curd results like that of Example I.

EXAMPLE III

The procedure of Example I is followed except that a milk clotting enzyme, specifically Novo Rennilase TL, a modified *Mucor meheii* enzyme, is added to the fermented retentate immediately prior to evaporation. The milk clotting enzyme is added to a concentration of 0.01 percent based on cheese and there is no coagulation or undue thickening of the fermented retentate. Further, no significant amount of para kappa casein is formed prior to evaporation.

After ten days, the percent of conversion of kappa casein to para kappa casein, was 75 percent. The curd knitted and cheese was provided.

EXAMPLE IV

In accord with this Example, the fermented retentate of Example I is prepared except that the salt is not added at fermentation or before introduction into the nip, but is instead added as dry salt to the collected curd. The level of addition of salt is sufficient to provide salt in the curd at 1.7 percent. The resulting cheese is like that prepared in Example I.

EXAMPLE V

Skim milk is heat-treated at 161° F. for 16 seconds and subjected to ultrafiltration to achieve a concentration of 5.0 fold, and then is diafiltered. The diafiltration is conducted to achieve a lactose level of about 0.1 percent. The diafiltration is conducted at about 4 to 1 (water to concentrate) yielding a final retentate which has 17.5 percent total solids.

The concentrated retentate is pasteurized at 165° F. for 16 seconds and cooled to 90° F. The pasteurized milk is standardized to a desired solids not-fat to fat ratio at about 0.9. Standardization is achieved by the addition of pasteurized cream (45 percent milk fat) at 45° F. The final retentate plus cream mix contains a lactose level of about 0.9 percent, thus limiting a pH reduction during fermentation to about 5.0. The retentate plus cream mix has about 27 percent total solids.

The unfermented retentate plus cream mix is fermented and processed in accord with Example I.

In accordance with this invention, the use of milk retentates and evaporative techniques are made possible to provide curd which will knit to provide a cheese having cheese body and texture.

The various features of the invention which are believed to be new are set forth in the following claims.

What is claimed is:

1. In a process for the manufacture of cheese curd from milk comprising the steps of:
    a. removing salts and lactose from the milk to provide a retentate having between about 50 percent and about 83 percent moisture, between about 0.7 percent and about 2.5 percent salts, and less than about 1.8 percent lactose;
    b. adding cheese-making cultures to the retentate and fermenting the retentate to a pH of between about 5.6 and about 4.8 without coagulation;
    c. spreading the uncoagulated rententate on a surface under vaccum and evaporating moisture from the retentate to a total solids content of 55 percent or more on the surface and providing a curd under quiescent conditions on the surface;
    d. doctoring off the curd from said surface without substantially disrupting the curd structure; and
    e. collecting the curd with minimum working of the curd and without substantial break down of the curd structure.

2. A process according to claim 1 in which whole milk is used and the moisture is between about 50 percent and about 70 percent, the salts are between about 1.0 percent and 2.5 percent, and lactose is below about 1.8 percent.

3. A process according to claim 1 in which a skim milk retentate is prepared having a moisture between about 78 percent and about 83 percent, a salts level between about 0.7 percent and about 1.9 percent, and lactose below about 0.6 percent; and the retentate is mixed, before evaporation with cream.

4. A process according to claim 1 wherein evaporation is effected at a temperature below about 75° F.

5. A process according to claim 1 wherein the salt is added at fermentation, prior to evaporation, during evaporation, or after evaporation.

6. A process according to claim 1 wherein the pH after fermentation is about 5.2.

7. A process according to claim 1 wherein dry salt is added and mixed with the curd after evaporation.

8. A process according to claim 1 wherein a milk clotting enzyme is added to the fermented retentate in a non-coagulating amount but in an amount sufficient to convert at least 65 percent of the kappa casein to para kappa casein after collecting.

9. A process in according to claim 1 wherein the surface is a drum surface.

10. A process according to claim 1 wherein the curd from step e is converted into cheese.

* * * * *

UNITED STATES PATENT AND TRADEMARK OFFICE
CERTIFICATE OF CORRECTION

PATENT NO. : 4,820,530

DATED : April 11, 1989

INVENTOR(S) : James W. Moran et al.

It is certified that error appears in the above-identified patent and that said Letters Patent is hereby corrected as shown below:

On the face of the patent, "Fitch, Even, Tabin & Tabin" should read: Fitch, Even, Tabin & Flannery U.S. Patent Documents: "2/1984" should read --2/1964--.

Column 2, line 54, delete "a".

Column 2, line 55, "hve" should read --have--.

Column 3, line 22, "not" should read --no--.

Column 4, line 35, Delete ",".

Column 5, line 49, "100" should be level with the rest of the equation.

Column 5, line 60, "by" should read --but--.

Column 6, line 12, "not" should read --no--.

Column 7, line 33, "purpose" should read --process--.

UNITED STATES PATENT AND TRADEMARK OFFICE
CERTIFICATE OF CORRECTION

PATENT NO. : 4,820,530

DATED : April 11, 1989

INVENTOR(S) : James W. Moran et al.

It is certified that error appears in the above-identified patent and that said Letters Patent is hereby corrected as shown below:

Column 10, line 29, Delete "in".

Signed and Sealed this

Tenth Day of December, 1991

*Attest:*

HARRY F. MANBECK, JR.

*Attesting Officer*   *Commissioner of Patents and Trademarks*